Oct. 20, 1942.  E. L. GRIFFITH  2,299,088
APPARATUS FOR ELECTRIC CONDUCTANCE COOKING
Filed Oct. 19, 1940   3 Sheets-Sheet 1
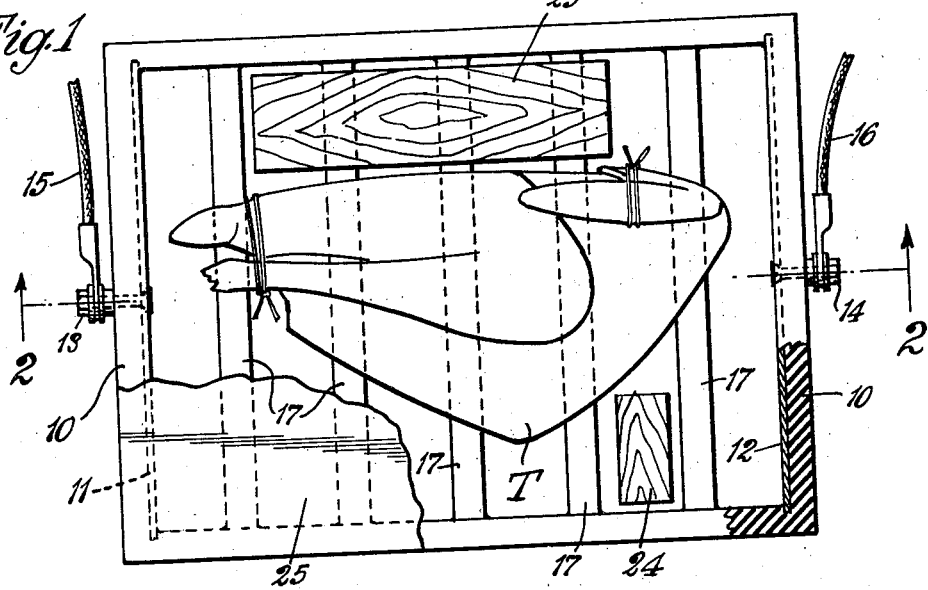
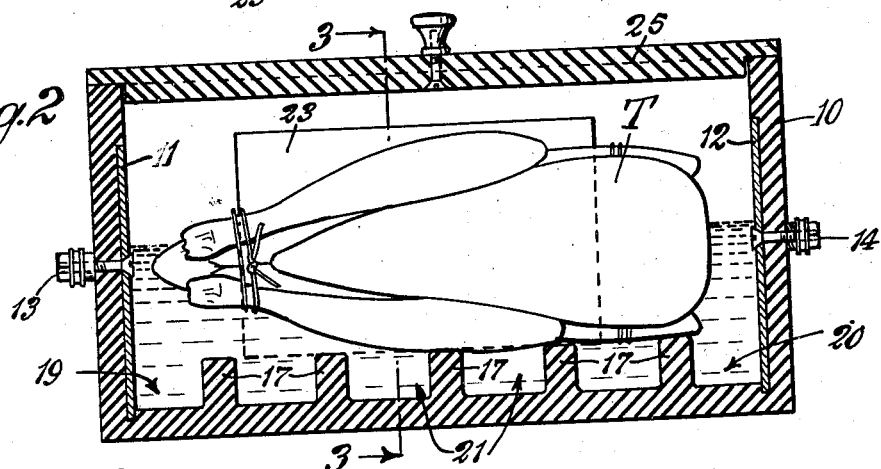
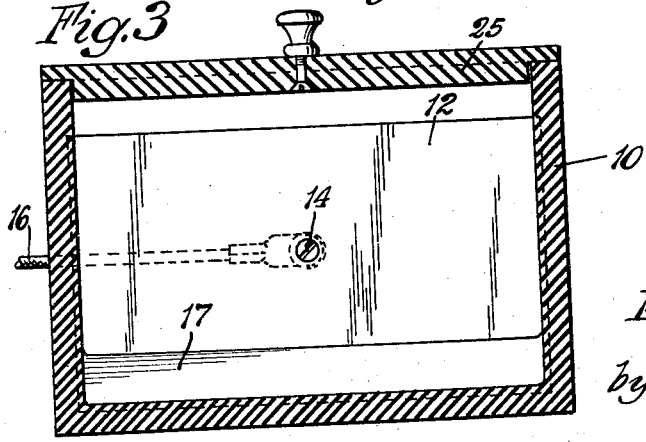
Inventor
Enoch L. Griffith
by W. Bartlett Jones
Attorney.

Oct. 20, 1942.  E. L. GRIFFITH  2,299,088
APPARATUS FOR ELECTRIC CONDUCTANCE COOKING
Filed Oct. 19, 1940  3 Sheets-Sheet 2
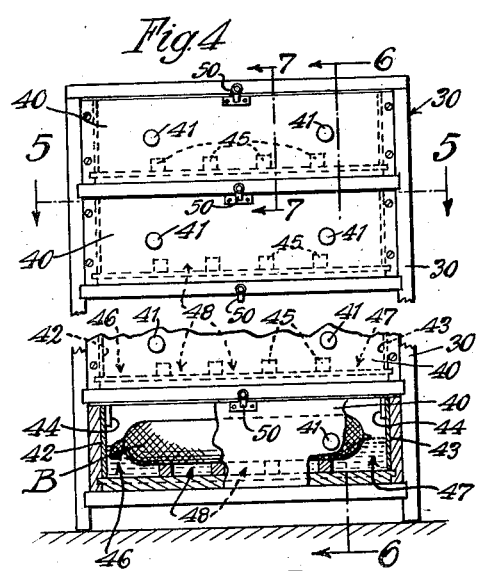
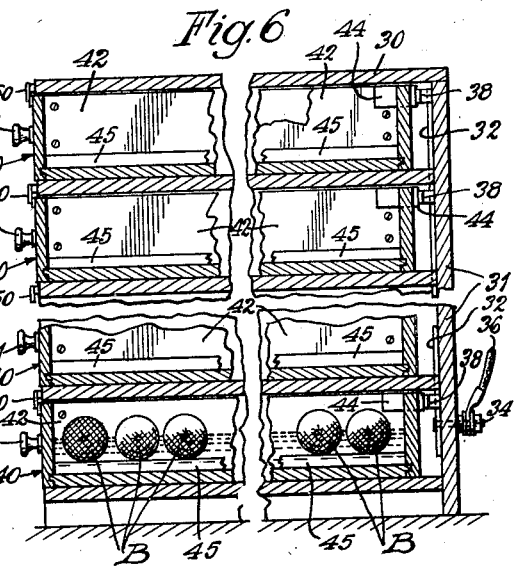
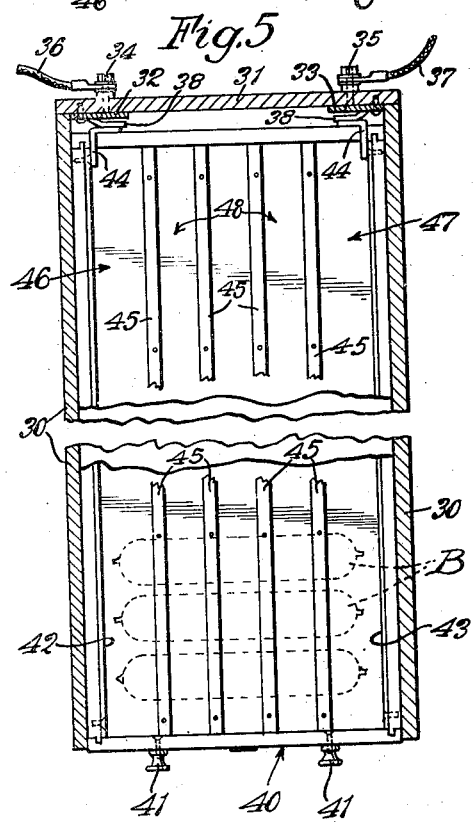
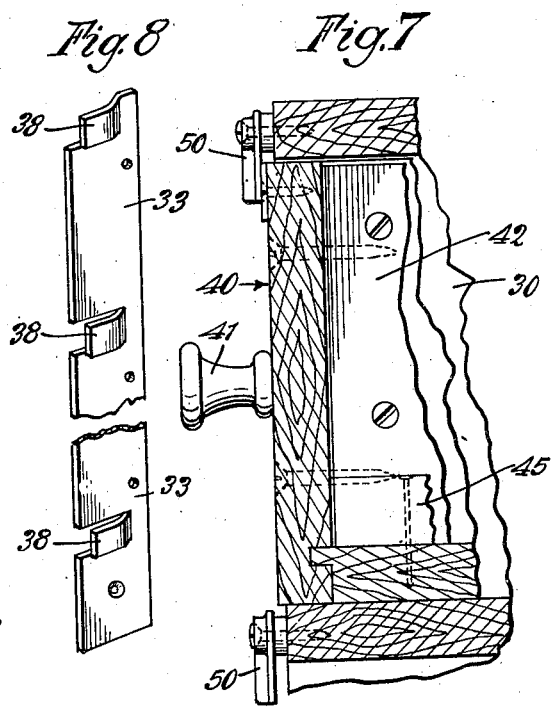
Inventor
Enoch L. Griffith
by W. Bartlett Jones
Attorney.

Oct. 20, 1942.  E. L. GRIFFITH  2,299,088
APPARATUS FOR ELECTRIC CONDUCTANCE COOKING
Filed Oct. 19, 1940  3 Sheets-Sheet 3
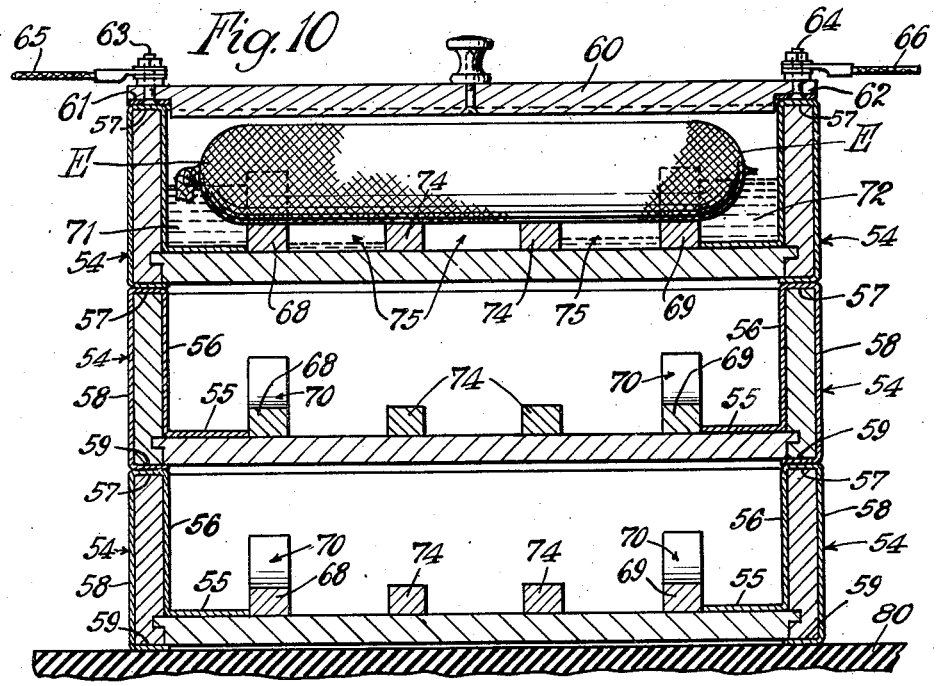
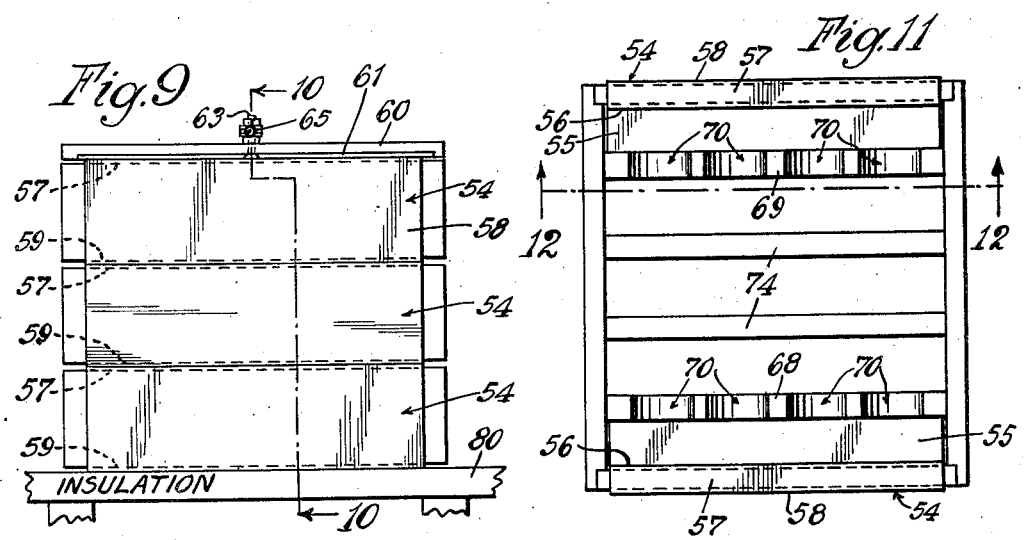
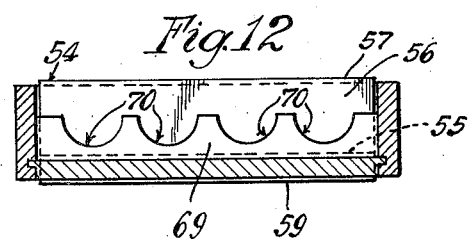
Inventor
Enoch L. Griffith
by W. Bartlett Jones,
Attorney.

# UNITED STATES PATENT OFFICE 2,299,088

APPARATUS FOR ELECTRIC CONDUCTANCE COOKING

Enoch L. Griffith, Chicago, Ill., assignor to The Griffith Laboratories, Inc., Chicago, Ill., a corporation of Illinois Application October 19, 1940, Serial No. 361,842

7 Claims. (Cl. 219—19)

The present invention relates generally to cooking articles of food by electrical conductance, and in particular it relates to the wholesale cooking of large pieces of meat, as required in the packing house industry, such as chickens, turkeys and other fowl, hams, bologna, and other large pieces of natural forms and artificial forms, like stuffed casings.

The idea of passing an electrical current through meat to cure it, or to thaw frozen meat, has long been known. The idea of passing a current through large pieces of meat to cook it has been known, but not commercialized. Various electrical conductance cookers for frankfurters and the like, have been both suggested and commercialized. These have taken the form of small units for domestic power voltages for use on lunch counters for cooking short orders sporadically as received.

The prior art devices are lacking in certain principles of construction and operation for use in production processes, as for example, in packing house practice. The successful cookers for frankfurters are of one general type, wherein two electrode systems are arranged to be bridged by a frankfurter, which in effect shorts the electrode systems by carrying a current which cooks the article. Encountered defects are heating too fast or too slow. Slow heating gives time for the casing to dry, embrittle, and burst, and this in general defeats the purpose of the cooker to hasten the process compared to normal means. Too-fast cooking generates steam and bursts the casing before proper attention to remove the frankfurter may be given.

Such cookers are timed generally by the nature of the electrode system. Some provide for an electrolyte solution, usually a kitchen salt solution, into which the ends of an arcuate frankfurter are dipped, with or without touching a metal electrode. Some provide means to keep the article from touching the electrode, and others intend the article to touch the electrode. Some permit great variations in the length of path through electrolyte to be traversed by the current before reaching the frankfurter. None of them are adapted for a straight length of article such as a straight frankfurter, or a straight elongated piece of meat, or for a chunk of meat. Some provide small areas of electrode, and some large areas relative to the area of the article of food in electrical contact.

Another form of food cooker is a vessel with an electrode at the bottom on which the food, such as a "roast," may rest, with an upper electrode movable to lie on top of the food for contact. Use of liquid to reach up to or above the top electrode is recommended to avoid burning. Another recommended form is a box with fixed vertical plates as electrodes between which meat to be cooked is packed close to the electrodes.

In experimenting with devices of this general nature for use in a wholesale industry, many defects in principle and application have been discovered which appear to be reasons why this art has not developed commercially in the packing house or a like production use.

Rapid cooking is an essential result in order to compete with prior practice. An advantage of quick cooking is minimizing of shrinkage, which is enhanced where the food is submerged in water or electrolyte solution. Therefore, minimizing long-time contact with water while cooking is a desired feature. In order to secure rapid cooking the current must be relatively high. This is attained by the nature of the electrical contact to the food. Where the food touches an electrode, a large area of contact gives the current required, but it also produces scorching at contact, which affects the appearance and taste. A small area of contact in the absence of electrolyte or liquid likewise gives a local high current to induce scorching. Surrounding a small area of contact with a conducting electrolyte tends to minimize, but does not avoid the scorching. A large area of direct contact to an electrode cannot be supplied with a quenching liquid or electrolyte. In the small frankfurter cookers, the depth of electrolyte, the form, small size and weight of the frankfurter, may permit a tangential contact with a metal electrode, and such has not been found to be a serious disadvantage. However, if an attempt is made to duplicate the nature of this contact with a large sized encased meat, such as 3 to 4 inch-diameter bologna, the weight of the article tends to flatten the form at contact and induce burning, even if the contact is covered with electrolyte. Also the amount of current required causes too much heat at such contact area. This overcooks the meat or causes steam pressure and bursting of encased meats.

According to the present invention the food is cooked with avoidance of direct contact with an electrode, and through contact made to the food by an electrolyte solution which itself is in contact with the electrode. In experimenting with such principle, several important things have been discovered. Enough current must be supplied to the food to effect speed in cooking. The resistance of the circuit between the food and the electrode must be low while avoiding a localized heavy current to the food. A large area of electrode must be provided so that current tends to converge to food through electrolyte. Sufficient minimum distance between food and electrode must prevail to permit this and to avoid local heavy current at the nearest area of the food to the electrode. The concentration of electrolyte in the liquid, such as sodium chloride, may be varied to control the current, and hence the time of cooking.

While attempting to consider all of these features, and at the same time to avoid excess bathing of the food in the electrolyte, it has been found that one condition may work against another, and that a balance must be effected.

In limiting the depth of liquid for contact, it is desirable to avoid submerging the article, in part to limit or avoid a liquid conductance path between the electrodes and parallel to the article, without impairing the desired effectiveness of electrical contact by liquid to the article. The present invention aims to secure these results.

Another feature of the invention is to limit the time period of electrical cooking, not only for economy in power, but to limit shrinkage and limit change in surface appearance.

One object of the present invention is to provide apparatus for production of electrically cooked meats and meat products, adapted for a wholesale use.

A particular object of the invention is to provide a cooking cell into which horizontally extending articles of meat or meat products may be placed without immersing the same in electrolyte, with provision for electrical contact to the article through an electrolyte medium.

Another object of the invention is the provision of means relatively to elevate the article of food so that its ends in contact with the electrolyte are projected into a body of electrolyte which may in part lie under the end for electrical contact on the underside of the article.

Still another object of the invention is the provision of a dam-like structure for forming a pool of electrolyte with a level at an end of the meat higher than any electrolyte which may lie on the other side of the dam-like structure.

Still another object of the invention is to provide a dam-like structure at both ends of an article to be cooked to form electrolyte pools for contact to the article, and to exclude electrolyte from contact with the intermediate portion of the article to be cooked.

Another object of the invention is the provision of a cell, in which an article is exposed to the atmosphere in the cell, with means to confine water vapor in said cell, whereby the drying out of the exposed article is minimized during the cooking.

Still another object of the invention is the provision of a type of cell structure which may be used in plurality, one cell with others, with a maximum of convenience in use.

Various other and ancillary objects and advantages of the invention will become apparent from the following description and explanation of the invention, in part explained by reference to the accompanying drawings in which:

Fig. 1 is a plan-view of a cooker in which a fowl is shown, placed for cooking.

Fig. 2 is a view of a vertical longitudinal section of the cooker of Fig. 1 on line 2—2 thereof.

Fig. 3 is a view of a vertical section of the cooker on line 3—3 of Fig. 2.

Fig. 4 represents a front view of a cooking cabinet with drawer-like cooking trays.

Fig. 5 is a view of horizontal section of the cabinet on line 5—5 of Fig. 4.

Fig. 6 is a view of vertical section of the cabinet from front to rear on line 6—6 of Fig. 4.

Fig. 7 is a view of a fragmentary vertical section of the cabinet of Fig. 4 on line 7—7 thereof, showing the construction and the locking of the drawer.

Fig. 8 is a perspective view of a contact bar in the rear of the cabinet.

Fig. 9 is a front elevation of a modified form in which cooking trays are superimposed for simultaneous operation.

Fig. 10 is a view of a vertical section of the assembly of Fig. 9 taken on line 10—10 thereof.

Fig. 11 is a plan-view of one of the trays of the assembly of Fig. 9.

Fig. 12 is a view of a vertical section of the tray of Fig. 11 taken on line 12—12 thereof.

Fig. 1 represents a cell which may be made of plastic material, such as Bakelite, with electrodes incorporated in the molding. It has a box-like body 10, and is large enough to house a large ham, a turkey, or several bologna about 20 inches long. In the ends are electrode plates 11 and 12, which may be iron, steel, carbon, or chromium-plated metal. Connector studs 13 and 14 pass to the outer side of the box as terminals for cables 15 and 16.

In the bottom, means is provided to serve as a supporting platform area for one or more bodies to be cooked. Preferably such means is molded integrally with a plastic box 10, but it may be removable inserts. As shown, it comprises integral bars 17 on the floor, dividing the floor into isolated wells or pools, 19 and 20 at the ends, and 21 intermediate the ends. The end pools contain the electrodes 11 and 12.

An article to be cooked is placed upon the platform whereby it is raised to permit electrolyte in the pools 19 and 20 to provide current to the underside of the article, convergingly from the electrode to the article. For illustration, a turkey is shown, about half immersed in brine solution, of for example ¼% strength. The bars 17 serve as insulating partitions to cut down the liquid current path through the liquid in pools 17—21—20. In order to cut down the liquid current path above the bars and alongside the turkey, the bars or partitions may be effectively extended by placing non-conducting pieces in the path of the current, such as blocks of wood 23 and 24. This principle may be applied in the apparatus of Fig. 1 and in the other and modified forms for the same objectives, and such insulators are more particularly useful in a cell with deeper electrolyte, a large irregular form, or one incompletely loaded with regular forms. The result is not only one in economy, but in concentrating the electrical contact to the article more to the ends or portions in the vicinity of the electrodes. Also for this objective, the wings and legs of fowl, are tied down to the body of the fowl to create and maintain bigger endwise bulk for such contact.

The cell is provided with a lid 25 to keep water vapor in the cell in contact with the exposed area of the article being cooked.

The apparatus of Fig. 1 may be used in a hotel or like kitchen for quickly cooking a fowl or a ham. Also a plurality may be cooked at once. It may also be used for cooking a number of bologna at once, in a packing house, by placing them in parallel on the bars 17. However, in such industrial use, larger and modified units are preferred.

One of these is shown in Fig. 4, which represents a cabinet, like a chest of drawers, in which the drawers are cooking trays. Safety features are involved in its construction and use. The trays are electrically disconnected when pulled out slightly, or more so, from the cabinet body. The drawers may be as deep as desired, and as many as desired. Wood is a suitable material as it may be easily replaced. It may have plastic varnishes if desired, or it may be a wood core with an integral plastic coat molded to it. Where it is simply wood, the drawers are made sufficiently loose fitting to take care of swelling, but such looseness is not illustrated in the drawings.

In Fig. 4, the numeral 30 represents a chest-like cabinet having the back panel 31 fitted with parallel contact bars 32 and 33 vertically in the rear corners. These have terminals 34 and 35 at the back for cables 36 and 37. Fig. 8 shows bar 33 with resilient off-set portions 38 spaced to contact a companion member on a drawer.

Each drawer is designated 40. It has pulling handles or knobs 41 on the front. The sides of the drawer (ends of the cell) have electrode plates 42 and 43 secured to the drawer, and each electrode has an angular extension 44, which may be welded to the plate at the rear. One face of the angle-extension lies against the back of the drawer to make contact with one of the parts 38 on the cabinet contact bars 32 and 33.

The interior of the drawer is similar, fundamentally, to the bottom of the cell of Fig. 1. There are parallel strips 45, as of wood, secured to the floor, forming electrode pools 46 and 47 and intermediate pools 48. The lower drawer is shown as being filled with bologna B, placed on the bars 45 with ends facing the electrodes. Electrolyte, for example, ¼% to ½% sodium chloride, is used to about 50% coverage. The bologna may touch each other advantageously to reduce the liquid path alongside the bologna.

In operation, the cabinet encloses the space in the cell to retain water vapor. No current can flow in a cell until it is closed, and hence there is little danger of an operator inserting his hand into the cell, or of touching a live part of the cell. A lock, as in the form of a turn button 50, may be provided for each drawer, to keep it closed with pressure on the resilient contact member 38.

The tray or cell structure of the invention is not limited to the form shown in Fig. 1 and Fig. 4. A modified cell interior is shown and is incorporated in a modified assembly of Fig. 9 for a plurality of cells. This constitutes a cell or tray of which a plurality may be superimposed to form an operative stack, the cover of which may be used to provide final contact. Each tray is made with an electrical contact above and below, to complete a current connection throughout the pile.

Thus, in Fig. 10, a box-like tray 54 is shown with an electrode having a horizontal portion 55 and a vertical portion 56. The vertical portion extends over the top edge at 57, down the side at 58, and under the bottom at 59. The bottom part 59 fits over the top part 57 of another tray, as they are piled. A lid or cover 60 is provided with two contact bars 61 and 62, terminals 63 and 64, and cables 65 and 66. The bars 61 and 62 are positioned to rest on tray contacts 57 when the lid is on a tray. The cover 60, or the bottom of a covering tray 54, keeps water vapor in the cell.

The cell structure has dams designed for co-operation with bologna-like articles to close the dams and form elevated pools of electrolyte at the electrodes. Thus, the high partitions 68 and 69 have recesses 70 therein to receive bologna, as shown, with ends E projecting into the electrode pools 71 and 72. Intermediate strips 74 support the body of the articles and provide intermediate pools 75.

The electrode pools are shown having electrolyte solution dammed above the lower part of the body of the bologna, which need not be immersed at all. If the dams leak fluid, it flows into the adjacent wells 75 as shown, and it need not enter the innermost one. Thus, there is no liquid path across the cell, filled and leaking as illustrated and described for Fig. 10. The intermediate strips serve as insulators to break and prevent a possible liquid connection across the floor of the cell.

It is understood that all of the cells are preferably placed on a suitable platform, such as shown at 86, electrically insulated.

Alternating current is employed to avoid electrolysis and electro-migration. Practically, for large sizes of meats industrially encountered, and for the desired quick cooking time industrially required, a voltage higher than 110 volts is indicated, and preferably 220 volts is used. A three phase system may be employed, using three like units, as will be well understood by electricians, and in such cases, the units are similarly filled and operated to effect a balanced load.

The apparatus may be used in various ways, and in particular to practice the method set forth in my companion cofiled application Serial No. 361,841, filed October 19, 1940. Various modifications of the apparatus are contemplated as falling within the scope of the appended claims.

I claim:

1. An electric cell for cooking articles of food comprising a container having electrodes at opposite portions thereof and adapted to contain an electrolyte solution in contact with said electrodes, said cell being provided with a bottom having means providing a horizontal level adapted to support an article of food placed between the electrodes in horizontal extent and in position above the bottom of the floor and the bottom of the solution in contact with the electrodes, said means comprising a plurality of spaced vertical partitions running transversely of the cell and of the direct line between the electrodes whereby to cut off a direct flow of current between the electrodes through electrolyte between two spaced partitions, said cell permitting the top level of the solution in contact with the electrodes to be located above the bottom of said article, whereby an article may be placed in the cell with ends thereof directed towards the electrodes with contact liquid beneath said ends.

2. An electric cell for cooking articles of food comprising a container having electrodes at opposite portions thereof and adapted to contain an electrolyte solution in contact with said electrodes, means in said cell being adapted to support an article in horizontal position from and above the floor of the cell with ends projecting towards the electrode, and means to dam electrolyte solution to form a pool at each electrode raised above the floor and above the supporting level provided by said means, said damming means having openings for the entry of the article to close the opening and to have contact with the electrolyte solution in the pool.

3. An electric cell for cooking articles of food comprising a container having electrodes at opposite portions thereof and adapted to contain an electrolyte solution in contact with said electrodes, said cell being provided with a bottom having means providing a horizontal level adapted to support an article in horizontal extent and in position above the bottom level of said electrolyte, said cell also being provided with wells in the vicinity of the electrodes with bottoms below the article-supporting level of the cell, whereby the end of an article supported in the cell may project over the well for electrolyte contact beneath the end of the article, said means extending transversely to the direct line from well to well whereby to cut off electric current in said direct line.

4. An electric cell for cooking articles of food comprising a container having electrodes at opposite portions thereof and adapted to contain an electrolyte solution in contact with said electrodes, said cell being provided with spaced dam partitions to form spaced pools for electrolyte in contact with the electrodes, said dam partitions being recessed for being plugged by opposite portions of an article to be cooked, whereby contact between the electrolyte and the article may be made with electrolyte at a higher level in the pool than the level of any electrolyte in the space between the dam partitions containing the body of the article.

5. An electric cell for cooking articles of food comprising a container having electrodes at opposite portions thereof and adapted to contain an electrolyte solution in contact with said electrodes, said cell being provided with spaced dam partitions to form spaced pools for electrolyte in contact with the electrodes, said dam partitions being notched to receive the opposed portions of an article in part below the level of liquid in the pool.

6. An electric cell for cooking articles of food comprising a container having electrodes at opposite portions thereof and adapted to contain an electrolyte solution in contact with said electrodes, said cell being provided with a plurality of spaced partitions on the floor providing a grid-like platform to support an article to be cooked in elevated position above the floor of the cell, said partitions crossing the cell transversely of the direct line between the electrodes whereby they serve to cut off a liquid conductance path along the floor of the cell through electrolyte between two spaced partitions beneath the supported article.

7. An electric cell for cooking articles of food comprising a container having electrodes at opposite portions thereof and adapted to contain an electrolyte solution in contact with said electrodes, said cell being provided with a plurality of spaced partitions on the floor providing a grid-like platform to support an article to be cooked in elevated position above the floor of the cell, said partitions crossing the cell in a direction transverse to the direct line between the electrodes whereby they serve to cut off a liquid conductance path in a direct line between electrodes along the floor of the cell beneath the supported article, the partitions adjacent the electrodes being higher to form dams for pools of electrolyte, said damming partitions being provided with openings to be closed by the supported article for electrical contact to the electrolyte in the pool.

ENOCH L. GRIFFITH.